(12) United States Patent
Shiban

(10) Patent No.: US 8,950,305 B1
(45) Date of Patent: Feb. 10, 2015

(54) SAW BRAKE

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 437 days.

(21) Appl. No.: 13/205,804

(22) Filed: Aug. 9, 2011

(51) Int. Cl.
*B26D 5/00* (2006.01)
*B26D 5/20* (2006.01)
*B26D 5/40* (2006.01)

(52) U.S. Cl.
USPC .................................. 83/58; 83/63

(58) Field of Classification Search
USPC ........ 83/471, 471.2, 471.3, 520–522.29, 478, 83/123, 435.27, 746, 58–68, 397, 544, 83/860, 477.2; 144/287, 286.1, 253.1
See application file for complete search history.

(56) References Cited

U.S. PATENT DOCUMENTS

| | | | | |
|---|---|---|---|---|
| 3,377,449 | A * | 4/1968 | Marquis | 200/504 |
| 3,785,230 | A * | 1/1974 | Lokey | 30/388 |
| 4,033,218 | A * | 7/1977 | Donatelle | 83/478 |
| 4,357,841 | A * | 11/1982 | Mote | 76/41 |
| 5,791,442 | A * | 8/1998 | Arnold | 188/138 |
| 6,418,829 | B1 * | 7/2002 | Pilchowski | 83/397 |
| 6,813,983 | B2 * | 11/2004 | Gass et al. | 83/62.1 |
| 6,826,988 | B2 * | 12/2004 | Gass et al. | 83/62.1 |
| 6,853,300 | B2 * | 2/2005 | Kuan | 340/565 |
| 6,877,410 | B2 * | 4/2005 | Gass et al. | 83/62.1 |
| 6,880,440 | B2 * | 4/2005 | Gass et al. | 83/62.1 |
| 6,900,728 | B2 * | 5/2005 | Metzger, Jr. | 340/562 |
| 6,945,148 | B2 * | 9/2005 | Gass et al. | 83/62.1 |
| 6,945,149 | B2 * | 9/2005 | Gass et al. | 83/62.1 |
| 6,957,601 | B2 * | 10/2005 | Gass et al. | 83/62.1 |
| 7,055,417 | B1 * | 6/2006 | Gass | 83/58 |
| 7,137,326 | B2 * | 11/2006 | Gass et al. | 83/58 |
| 7,231,856 | B2 * | 6/2007 | Gass et al. | 83/58 |
| 7,284,467 | B2 * | 10/2007 | Gass et al. | 83/58 |
| 7,290,472 | B2 * | 11/2007 | Gass et al. | 83/62.1 |
| 7,290,474 | B2 * | 11/2007 | Keller | 83/477.2 |
| 7,347,131 | B2 * | 3/2008 | Gass | 83/58 |
| 7,350,445 | B2 * | 4/2008 | Gass et al. | 83/58 |
| 7,353,737 | B2 * | 4/2008 | Gass et al. | 83/62.1 |
| 7,373,863 | B2 * | 5/2008 | O'Banion et al. | 83/63 |
| 7,640,835 | B2 * | 1/2010 | Gass | 83/13 |
| 7,644,645 | B2 * | 1/2010 | Gass et al. | 83/62.1 |
| 7,685,912 | B2 * | 3/2010 | Gass et al. | 83/62.1 |
| 7,698,976 | B2 * | 4/2010 | Gass | 83/58 |
| 7,827,889 | B2 * | 11/2010 | Carrier | 83/63 |
| 7,845,258 | B2 * | 12/2010 | Gass et al. | 83/58 |
| 7,895,927 | B2 * | 3/2011 | Gass | 83/62.1 |
| 7,924,164 | B1 * | 4/2011 | Staerzl | 340/573.1 |
| 7,958,806 | B2 * | 6/2011 | Gass et al. | 83/58 |
| 8,061,246 | B2 * | 11/2011 | Gass et al. | 83/62.1 |
| 8,079,295 | B2 * | 12/2011 | Gass | 83/478 |
| 8,113,097 | B2 * | 2/2012 | Marx et al. | 83/58 |
| 8,122,798 | B1 * | 2/2012 | Shafer et al. | 83/62.1 |
| 8,186,256 | B2 * | 5/2012 | Carrier | 83/63 |
| 2003/0020336 | A1 * | 1/2003 | Gass et al. | 307/326 |
| 2004/0099492 | A1 * | 5/2004 | Onuki et al. | 188/163 |
| 2004/0194594 | A1 * | 10/2004 | Dils et al. | 83/13 |
| 2005/0139058 | A1 * | 6/2005 | Gass et al. | 83/478 |
| 2005/0268767 | A1 * | 12/2005 | Pierga et al. | 83/581 |

(Continued)

*Primary Examiner* — Ghassem Alie
*Assistant Examiner* — Bharat C Patel
(74) *Attorney, Agent, or Firm* — James Creighton Wray

(57) ABSTRACT

An improvement in table saw safety is provided, being a new and improved apparatus and method for stopping the blade of a saw very quickly, thereby preventing serious harm to the operator of the saw. The saw brake senses the approach of a conductive element, such as a finger or a hand, to the saw blade, and immediately stops the saw.

7 Claims, 16 Drawing Sheets

(56) References Cited

U.S. PATENT DOCUMENTS

| | | | |
|---|---|---|---|
| 2006/0032352 A1* | 2/2006 | Gass et al. | 83/58 |
| 2006/0225551 A1* | 10/2006 | Gass | 83/76.8 |
| 2007/0028733 A1* | 2/2007 | Gass | 83/58 |
| 2007/0186741 A1* | 8/2007 | Buck et al. | 83/438 |
| 2008/0245200 A1* | 10/2008 | Campbell | 83/13 |
| 2008/0295660 A1* | 12/2008 | Gass et al. | 83/58 |
| 2009/0114070 A1* | 5/2009 | Gass | 83/76.8 |
| 2009/0133555 A1* | 5/2009 | Gass et al. | 83/74 |
| 2009/0241748 A1* | 10/2009 | Keller et al. | 83/522.13 |
| 2010/0011926 A1* | 1/2010 | Murakami et al. | 83/58 |
| 2010/0180739 A1* | 7/2010 | Gass | 83/58 |
| 2010/0180741 A1* | 7/2010 | Gass et al. | 83/74 |
| 2010/0236663 A1* | 9/2010 | Gass | 144/329 |
| 2010/0263509 A1* | 10/2010 | Gass | 83/58 |
| 2010/0307307 A1* | 12/2010 | Butler | 83/58 |
| 2011/0023670 A1* | 2/2011 | Gass | 83/13 |
| 2011/0023673 A1* | 2/2011 | Gass | 83/58 |
| 2011/0072942 A1* | 3/2011 | Gass | 83/58 |
| 2011/0079124 A1* | 4/2011 | Carrier | 83/63 |
| 2011/0138978 A1* | 6/2011 | Gass et al. | 83/58 |

\* cited by examiner

SAW BRAKE

BACKGROUND OF THE INVENTION

In any dangerous activity there is the motivation to provide additional safety. The present invention is motivated by injuries resulting from contact between the blades of table saws and the human body, even in the presence of traditional saw guards.

SUMMARY OF THE INVENTION

A traditional saw guard is an enclosure shaped around the saw blade that is intended to prevent fingers and hands from coming into contact with the spinning saw blade. The present invention provides additional safety by incorporating a detection system into the guard such that when a conductive element such as a finger or hand contacts alarm bars placed on the guide, alarms are sounded and a brake is applied to the saw, thereby preventing serious injury.

The saw brake is activated in one of two ways. In the first way, a signal connection is made when a person's finger or hand touches the two alarm bars of the guard. The person's finger or hand completes a circuit causing an audible alarm and a light to turn on. The touching of the alarm bars also disconnects power to the saw motor and activates a brake to immediately stop the saw blade. In the second way, the saw guard uses a capacitance or resistance switch. At any point if someone touches what is designated as a hazard area with his or her finger or hand an audible alarm and light are energized, saw power is stopped, and a saw brake is activated. This second method only requires the person to touch one place on the alarm bars or a hazard area.

The alarm bars are located within one inch of each side of the blade, between one and four inches in front of the saw blade and between one-half inch and one inch above the table.

The location and the configuration of the braking mechanism depends on the type and features of the individual saw model. For example, the solenoid can be mounted directly on a bottom of the table, on a saw guard base below the table, or on the saw guard. Several methods of mounting the braking mechanism are illustrated in the accompanying drawings but should not be considered the exclusive means of operation.

These and further and other objects and features of the invention are apparent in the disclosure, which include the above and ongoing written specification, with the drawings.

DETAILED DESCRIPTION OF THE DRAWINGS

Figure 1:
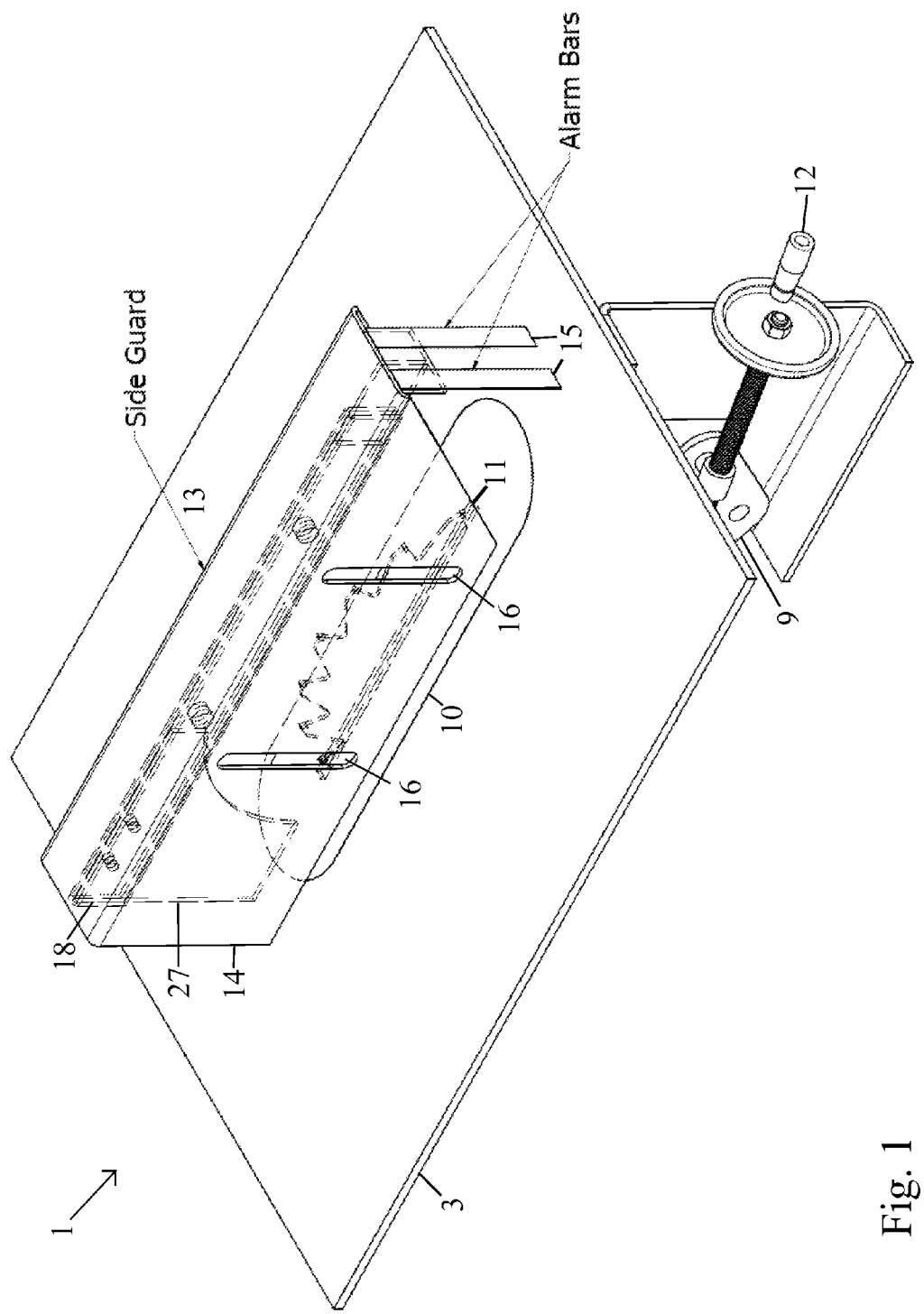
FIG. 1 is a top perspective view of a saw brake system with conductive finger and hand guards.

FIG. 1 is a top perspective view of a saw brake system with conductive finger and hand guards. A table saw 1 has a table 3 and a saw blade 5 mounted in a bearing (FIGS. 2-7) on bell crank arm 9. Arm 9 and saw 5 may be raised and lowered through a slot 11 in plate 10 in a center of the table 3. This action is accomplished by adjusting a crank 12, which turns a screw in a nut pivoted on the bell crank and raises and lowers the arm 9, thereby raising and lowering the saw blade 5 through the slot 11.

An inverted U-shaped saw guard 13 is positioned over the saw blade 5 so as to prevent direct contact therewith. Guard 13 is mounted on the horizontal beam 18 connected to the vertical guard mount 27. Guard 13 has sides 14 with sloping forward edges. Guard 13 is positioned so as to move up and down with guide slots 16 moving along pins extending from the guard support beam 18 to allow different thicknesses of material to be cut by the saw. The guard assembly and pins which guide the slots are mounted on guard beam 18. The alarm bars 15 are mounted on the front of the saw guard 13 in such a manner that while the saw is operating, attempts to push a material into the saw with the fingers or hands touching the alarm bars 15 completes a circuit between the alarm bars 15 through the user's fingers or hand.

Figure 2:
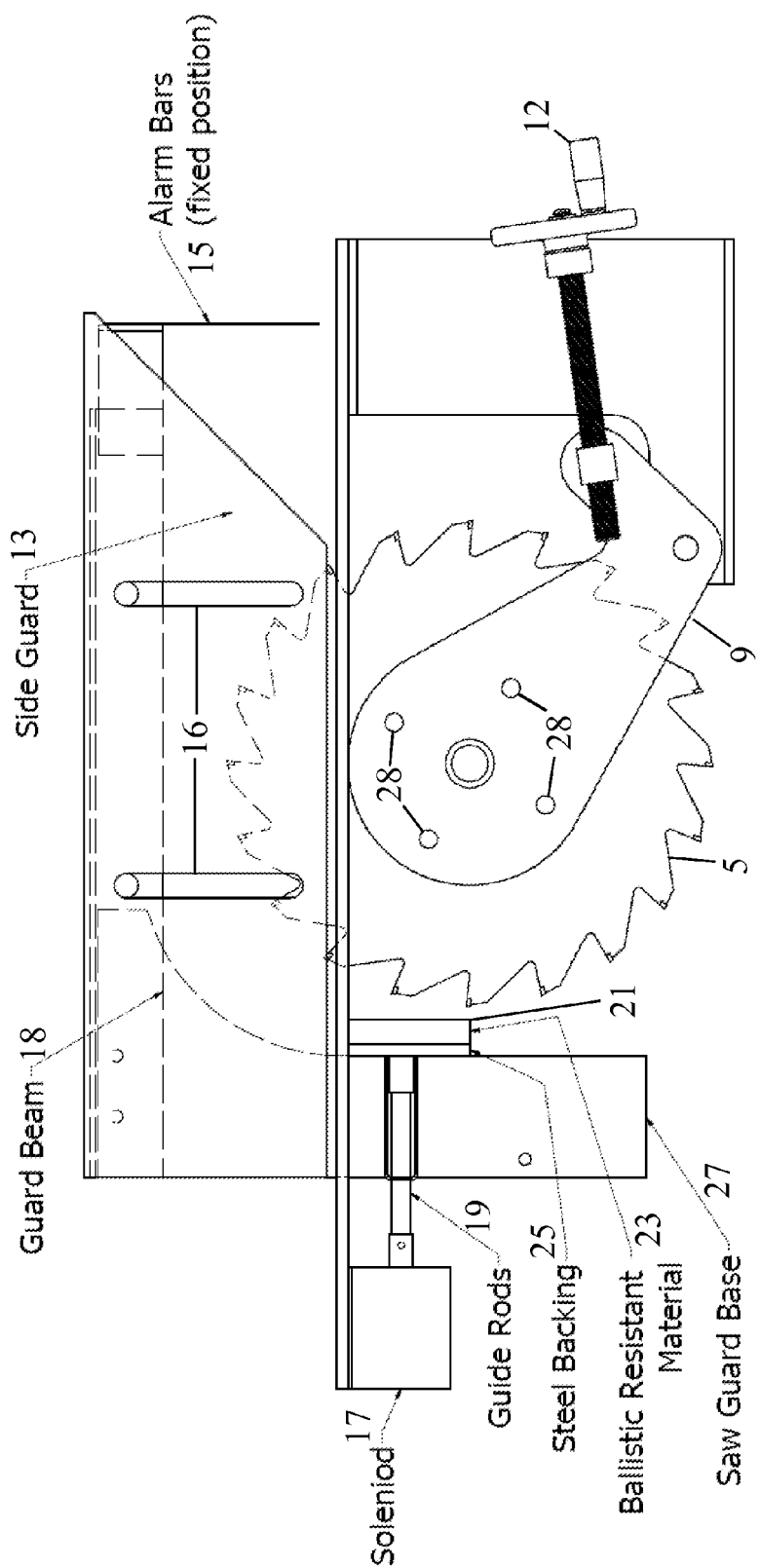
FIG. 2 is a side elevation of the saw brake system with conductive finger and hand guards shown in FIG. 1, and a solenoid operated saw brake.

FIG. 2 is a side elevation of the saw brake system with conductive finger and hand alarm bars 15 shown in FIG. 1, and a solenoid operated saw brake. A solenoid 17 is shown mounted on a bottom of the table 3 with drive rods 19 from the solenoid 17 to rapidly drive the saw brake plate 21 into engagement with the saw. The saw brake plate 21 has a ballistic resistant material 23 attached to a steel backing plate 25 that is connected to the drive rods 19. The solenoid instantaneously drives rods 19, steel backing plate 25 and the ballistic resistant material 23 into the teeth of the saw blade, thereby braking and stopping the saw.

A motor M for rotating the saw is mounted on motor mounts 28 on arm 9.

When the alarm bars 15 come into contact with a conductive material such as a finger or hand, the solenoid 17 is activated, pushing the saw brake 21 into the blade 5 by means of the drive rods 19.

Figure 3:
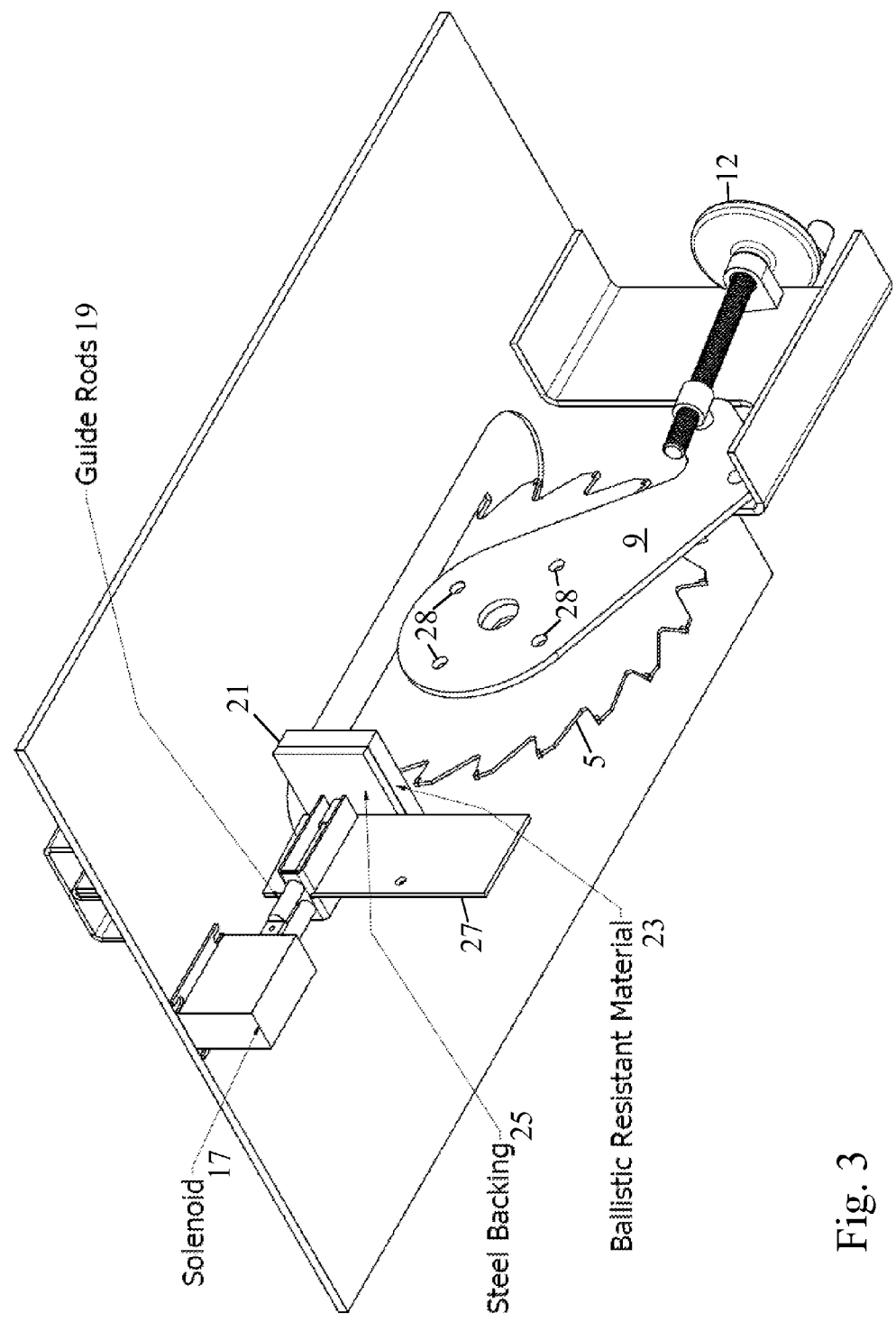
FIG. 3 is a bottom perspective view of a saw brake system with a solenoid operated saw brake as shown in FIGS. 1 and 2.

FIG. 3 is a bottom perspective view of a saw brake system with conductive finger and hand guards with a solenoid operated saw brake as shown in FIGS. 1 and 2. The guide rods 19 are attached to the steel backing 25 on either side of the saw guard base 27.

Figure 4:
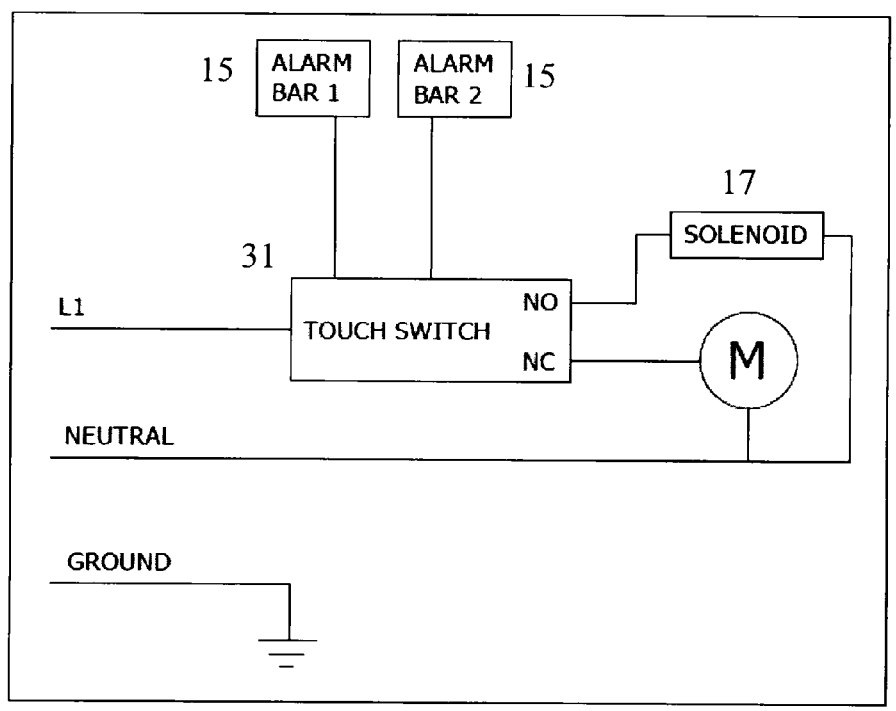
FIG. 4 is a schematic representation of an electrical circuit using the alarm bars shown in FIGS. 1 and 2 to initiate an alarm.

FIG. 4 is a schematic detail of the electrical circuit using the alarm bars shown in FIGS. 1 and 2 to initiate an alarm. A touch switch 31 is connected to alarm bars 15. When there is no contact, the motor M runs and the saw operates. When the user touches the alarm bars 15, the touch switch 31 opens the normally closed (NC) power circuit to the motor and at the same time closes the normally open (NO) DC circuit to activate the solenoid 17, pressing the saw brake plate 21 into the blade 5 and instantaneously stopping the saw's rotation.

Figure 5:
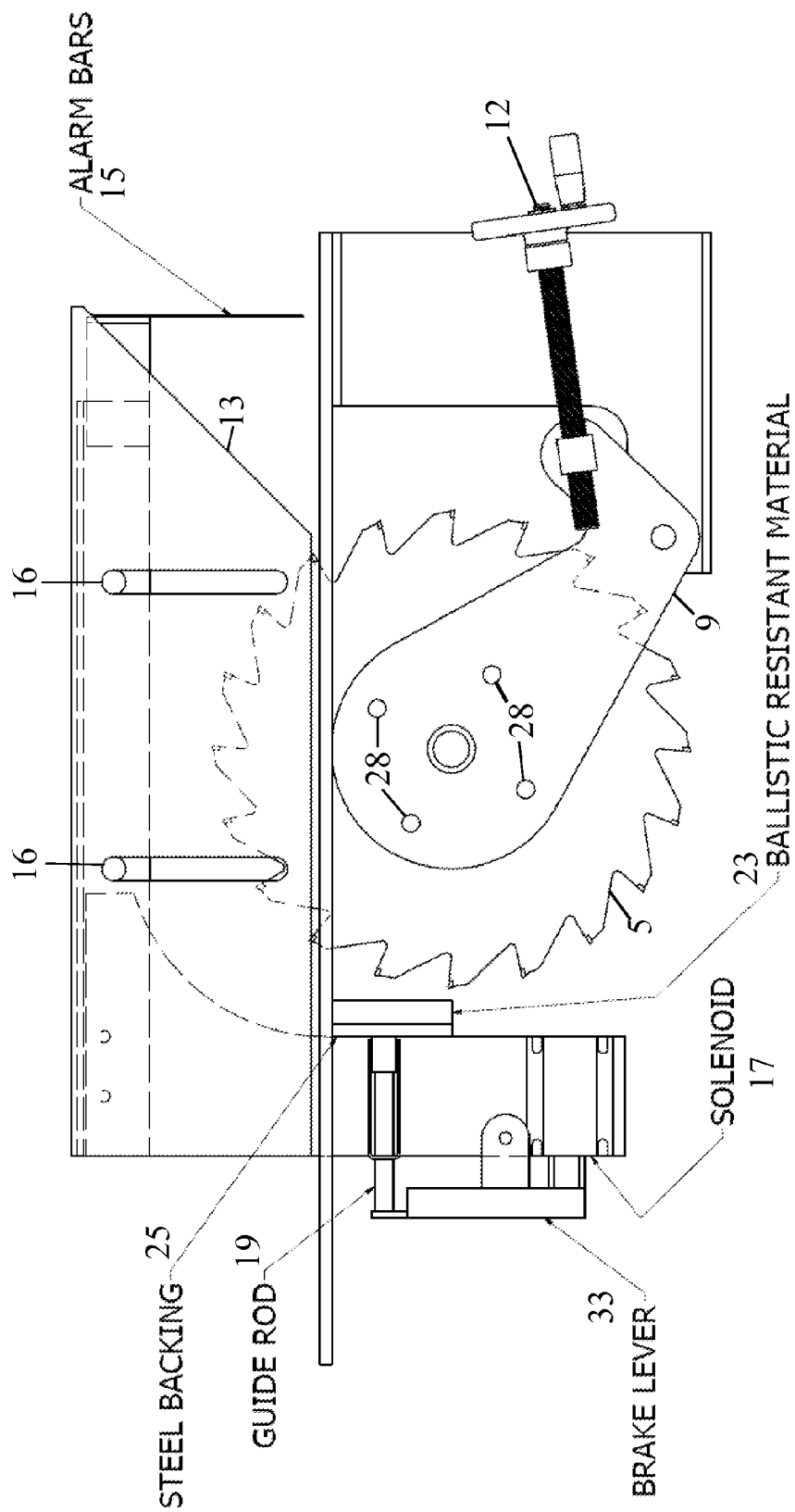
FIG. 5 is a side elevation of the saw brake system with conductive finger and hand guards and with the solenoid driving a lever for operating the saw brake.

FIG. 5 is a side elevation of the saw brake system with conductive finger and hand guards with the solenoid operating on the saw brake with a lever. In this embodiment, solenoid 17 is connected to drive rod 19 by way of a brake lever 33. Steel backing 25 and ballistic resistant material 23 remain as above.

Figure 6:
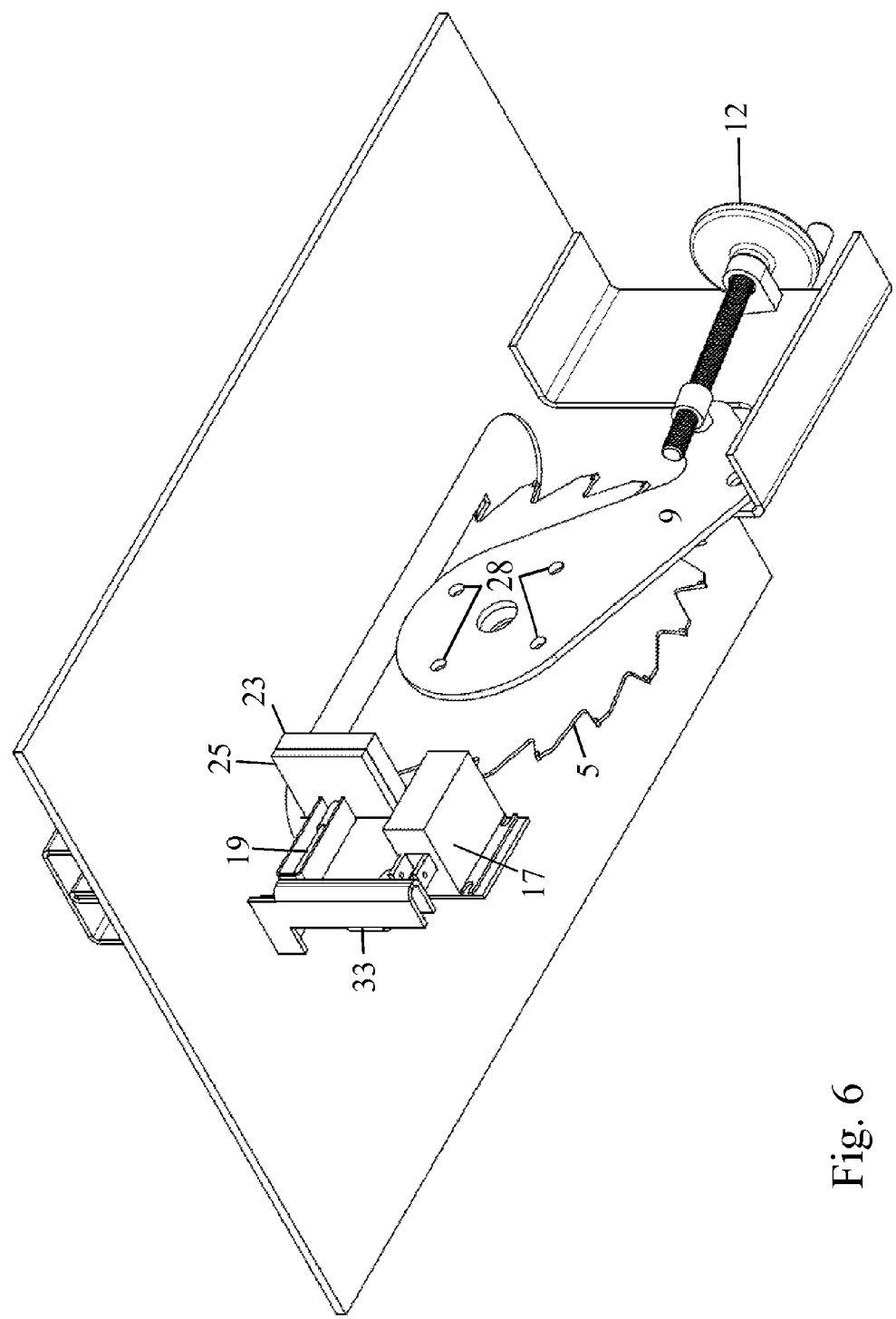
FIG. 6 is a bottom perspective view of the saw brake system with the solenoid operating on the saw brake with a lever as shown in FIG. 5.

FIG. 6 is a bottom perspective view of the saw brake system with the solenoid operating on the saw brake with a lever. Solenoid 17 is connected to drive rods 19 by way of a brake lever 33, thereby pressing the steel backing 25 and ballistic resistant material 23 into the saw blade 5.

Figure 7:
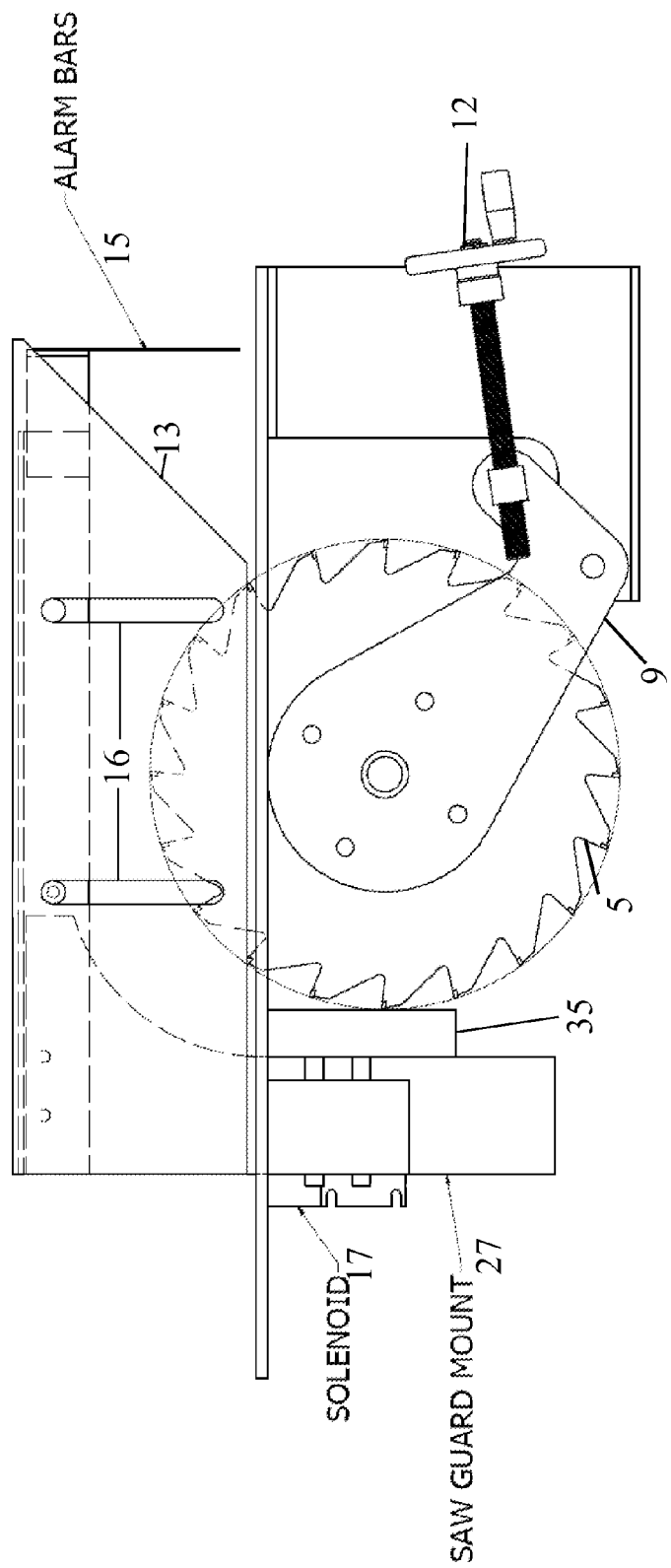
FIG. 7 is a side elevation of the saw brake system with conductive finger and hand guards with the solenoid mounted on the saw guard mounting base.

FIG. 7 is a side elevation of the saw brake system with conductive finger and hand guards with the solenoid 17 mounted to one side of the guard mount 27. Also in this drawing is an alternative embodiment of the braking element 35.

Figure 8:
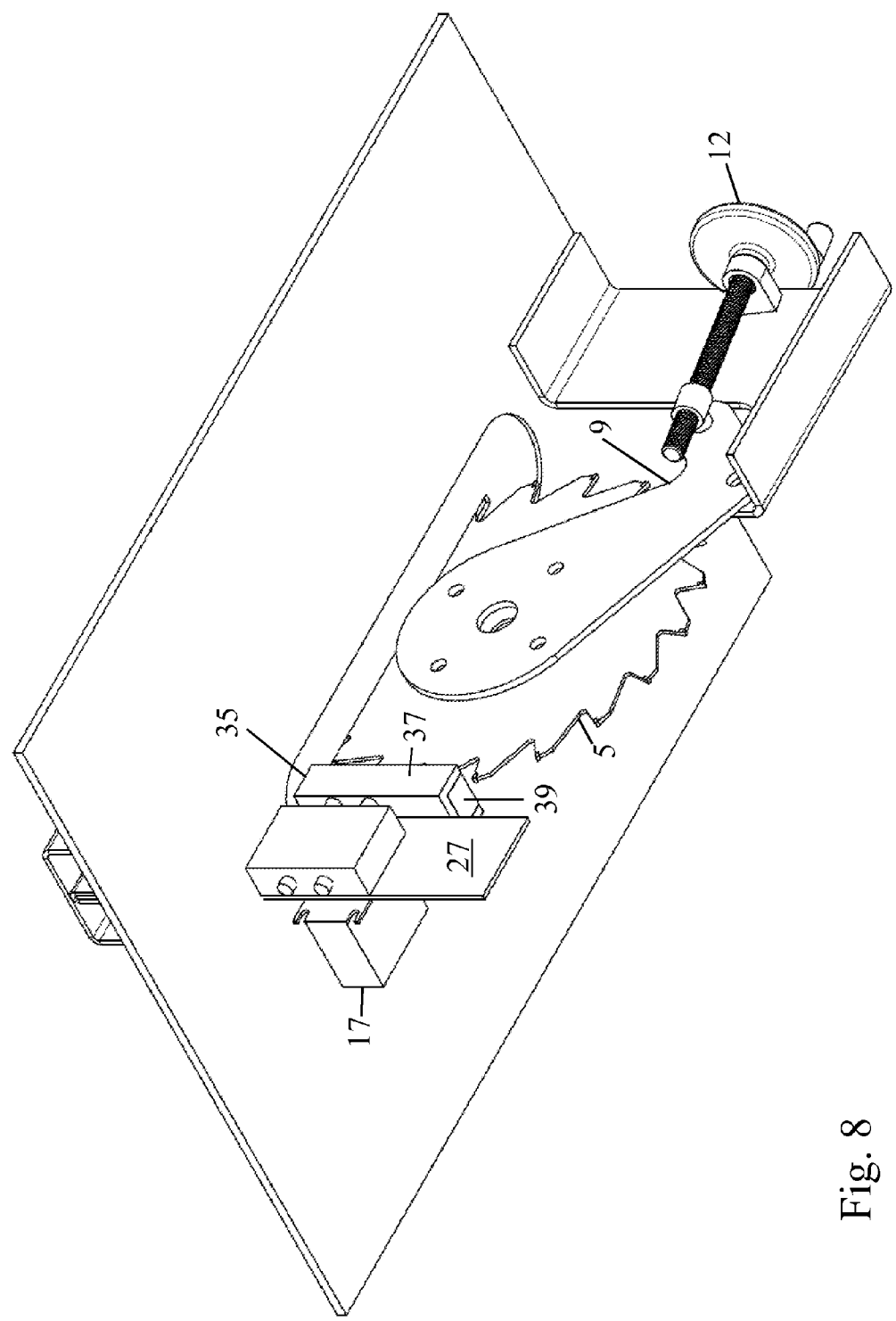
FIG. 8 is a bottom perspective view of the saw brake system with the solenoid mounted on the guard mount.

FIG. 8 is a bottom perspective view of the saw brake system with the solenoid 17 mounted to one side of the guard mount 27. Here, the braking element 35 consists of a U-shaped steel backing surface 37, around a ballistic resistant material 39. As above, the solenoid 17 pushes the braking element 35 into saw blade 5, instantaneously stopping the blade's rotation.

Figure 9:
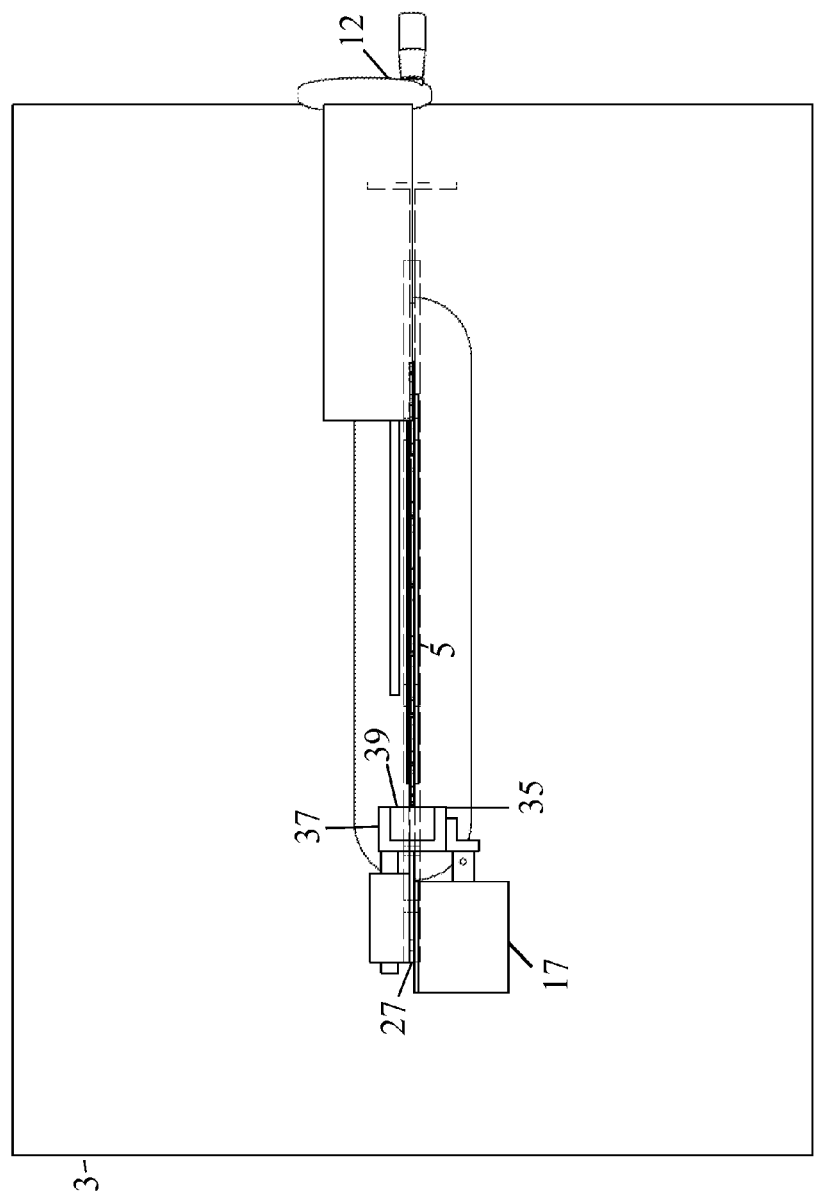
FIG. 9 is a bottom view of the saw brake system with the solenoid mounted on the guard mount.

FIG. 9 is a bottom view of the saw brake system with conductive finger and hand guards with the solenoid mounted to one side of the guard mount. Solenoid 17 is shown mounted to one side of the guard mount 27, connected to braking element 35. Braking element 35, as also shown in FIGS. 7 and 8, consists of a U-shaped steel backing surface 37 around a ballistic resistant material 39.

Figure 10:
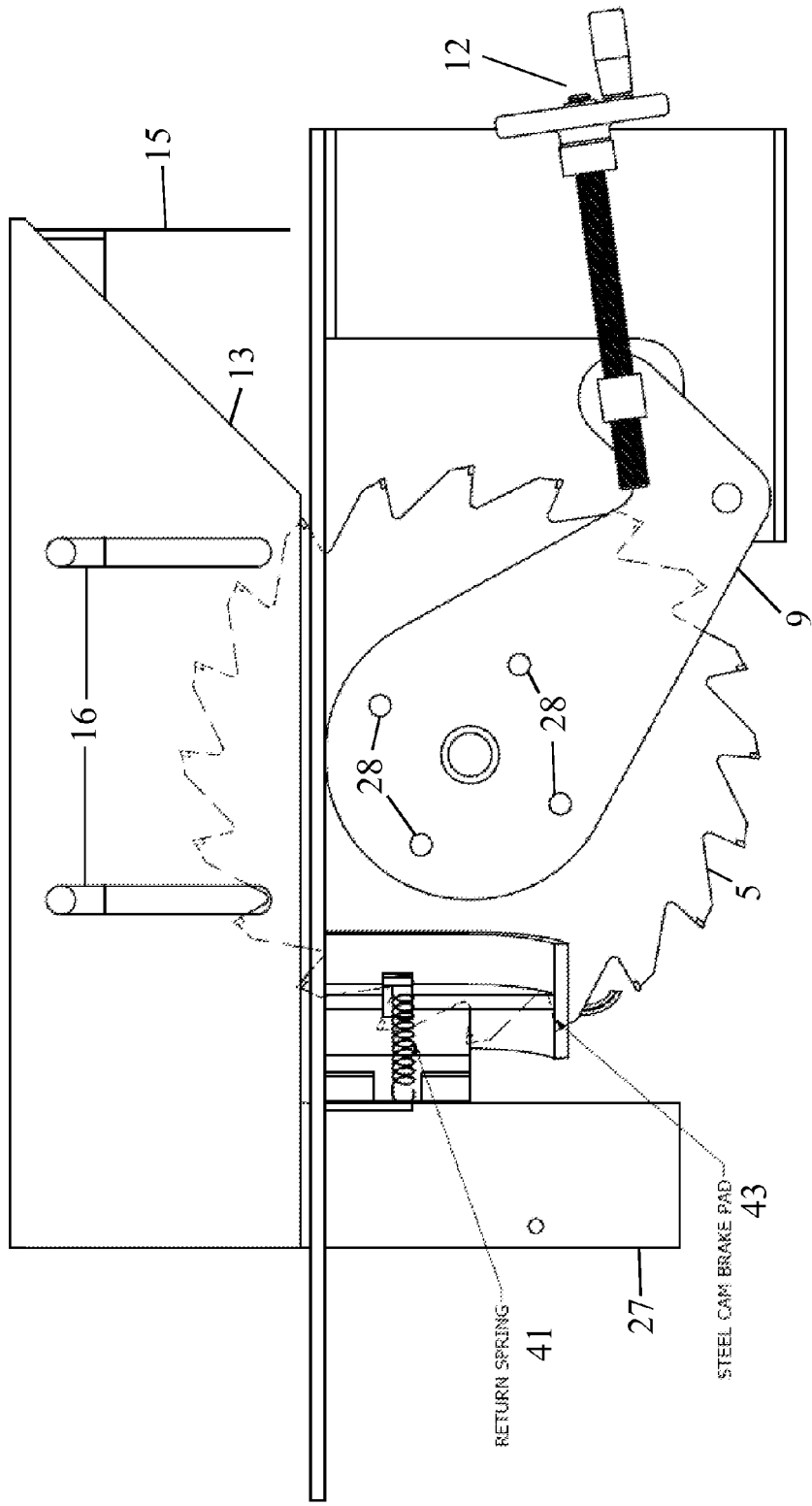
FIG. 10 is a side elevation of the saw brake system with conductive finger and hand guards, with the saw brake operated by gripping and stopping the saw with a steel brake and electromagnet and return springs for releasing the brake.

FIG. 10 is a side elevation of the saw brake system with conductive finger and hand guards with the saw brake operated by gripping and stopping with a steel brake and electromagnet and return spring. Instead of a solenoid, the braking element is, in this embodiment, operated by an electromagnet and return spring 41. Return spring 41 holds the steel cam brake pads 43 open unless an electromagnet is activated. When the electromagnet 47 is activated, the steel cam brake pads 43 are pulled together against the tension caused by the return springs 41. When the brake pads come into contact with the blade 5, the motion of the blade 5 is stopped.

Figure 11:
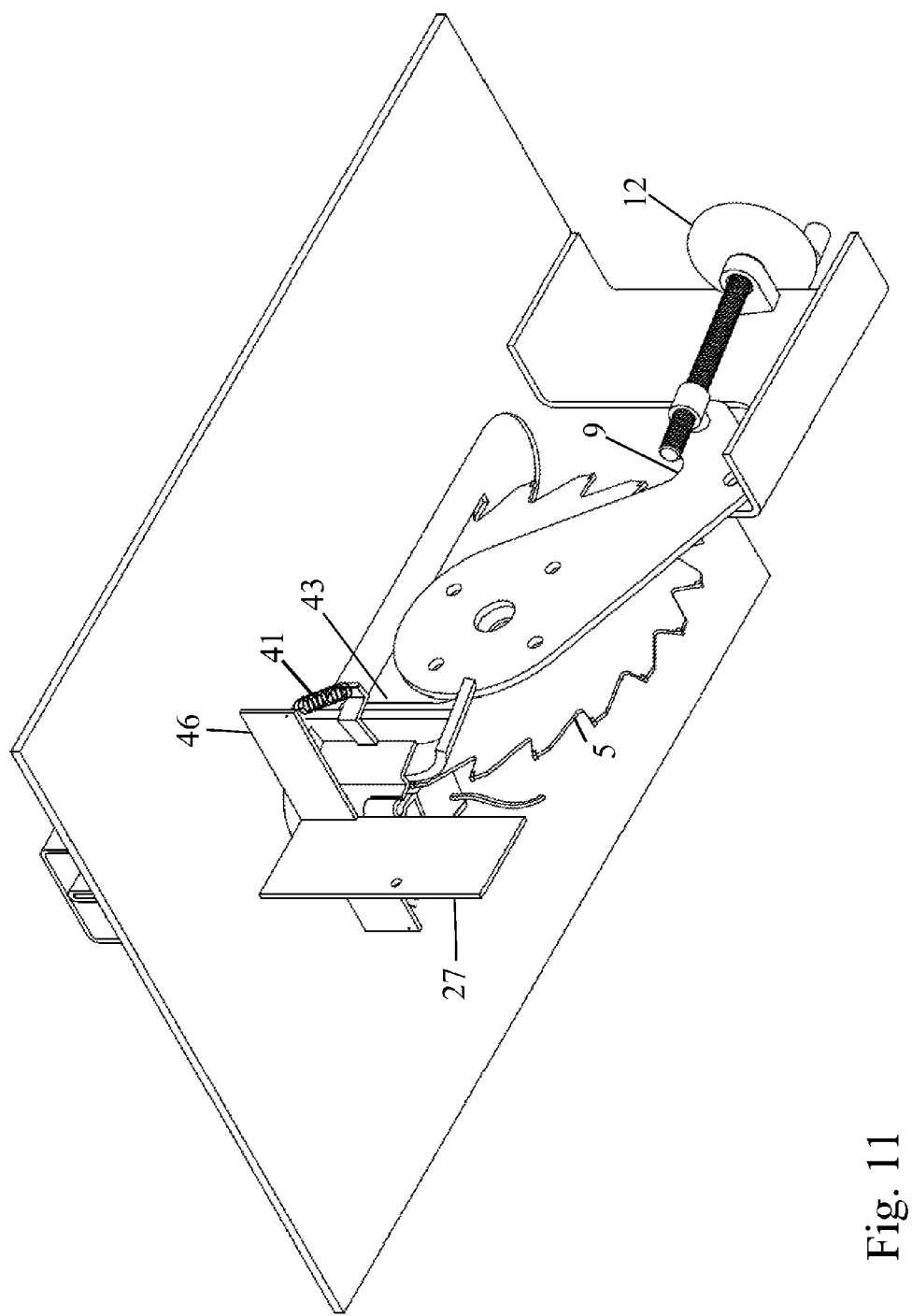
FIG. 11 is a bottom perspective view of the saw brake system showing the saw brake operated by gripping and stopping the saw with a steel brake and electromagnet and return springs for releasing the brake.

FIG. 11 is a bottom perspective view of the saw brake system with conductive finger and hand guards with the saw brake operated by gripping and stopping with a steel brake and electromagnet and return spring.

Figure 12:
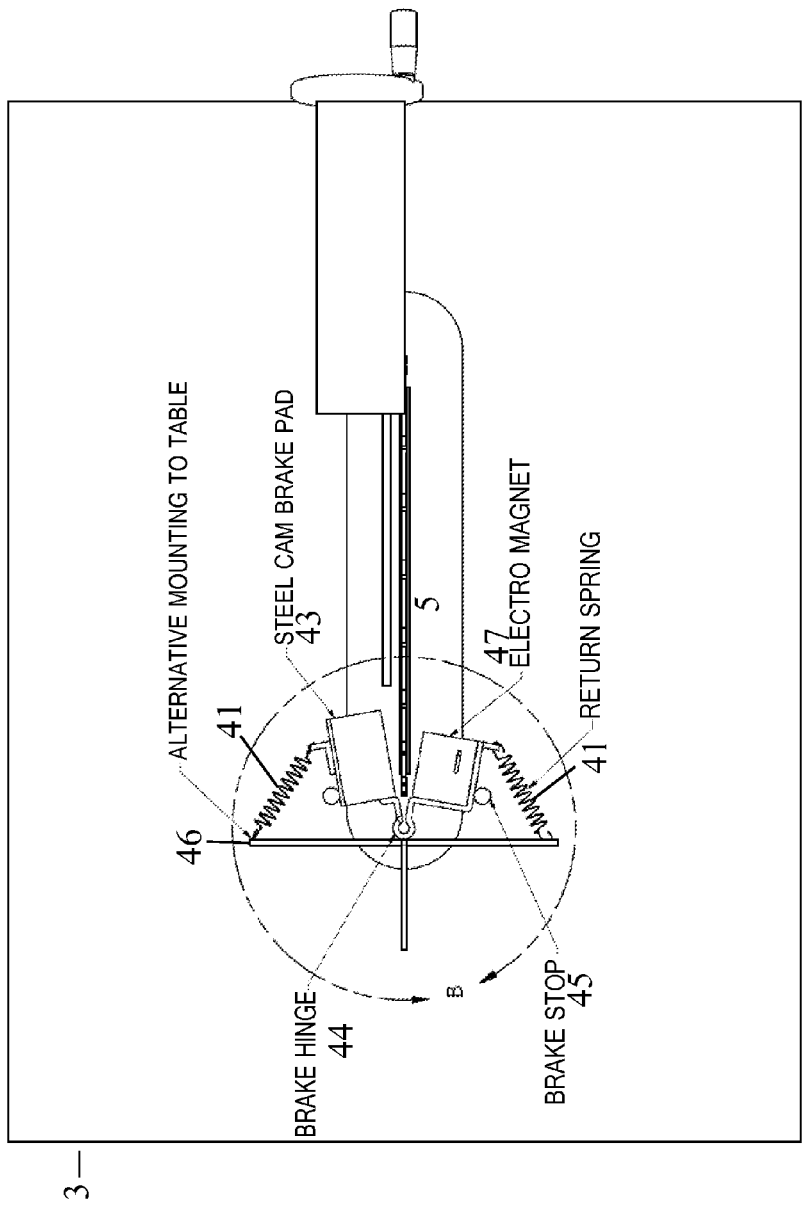
FIG. 12 is a bottom view of the saw brake system with the saw brake operated by gripping and stopping the saw with a steel brake and electromagnet and return springs for releasing the brake.

FIG. 12 is a vertical elevation of the saw brake system with conductive finger and hand guards with the saw brake operated by electromagnet and return spring. The steel cam brake pads 43 are mounted to the brake hinge 44, which allows them to move relative to each other and the saw blade 5. The steel cam brake pads 43 are held against the brake stops 45 by the return springs 41. The return springs 41 are connected on one side to the steel cam brake pads 43 and on the other side to the spring mount 46. When the electromagnet 47 is activated, the steel cam brake pads 43 are pulled together against the tension caused by the return springs 41. When the brake pads come into contact with the blade 5, the motion of the blade 5 is stopped. Alternatively, the return springs 41 can be affixed to the table 3, instead of the spring mount 46.

Figure 13:
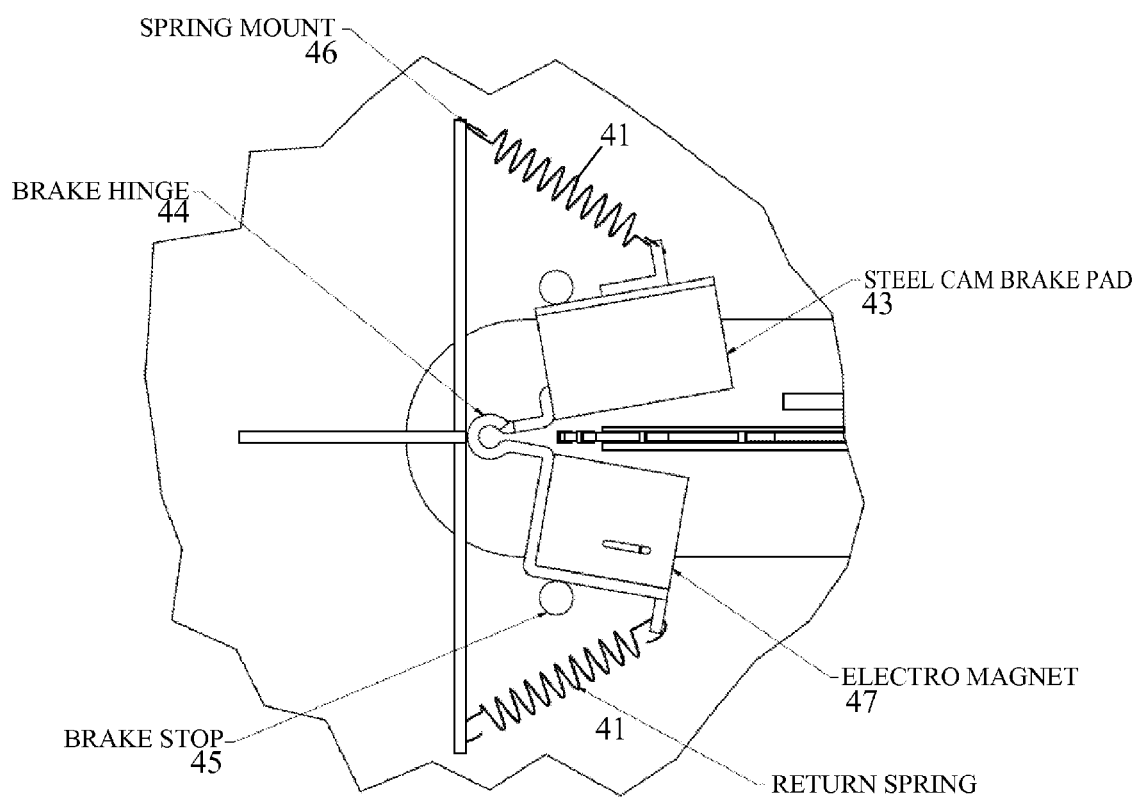
FIG. 13 is a detail view of the gripping steel brake and electromagnet and return spring brake system as shown in FIGS. 10-12.

FIG. 13 is a detail view of the saw brake system with conductive finger and hand guards with the saw brake operated by electromagnet and return spring. The steel cam brake pads 43 are mounted to the brake hinge 44, which allows them to move relative to each other and the saw blade 5. The steel cam brake pads 43 are held against the brake stops 45 by the return springs 41. The return springs 41 are connected on one side to the steel cam brake pads 43 and on the other side to the spring mount 46. When the electromagnet 47 is activated, the steel cam brake pads 43 are pulled together against the tension caused by the return springs 41. When the brake pads come into contact with the blade 5, the motion of the blade 5 is stopped.

Figure 14:
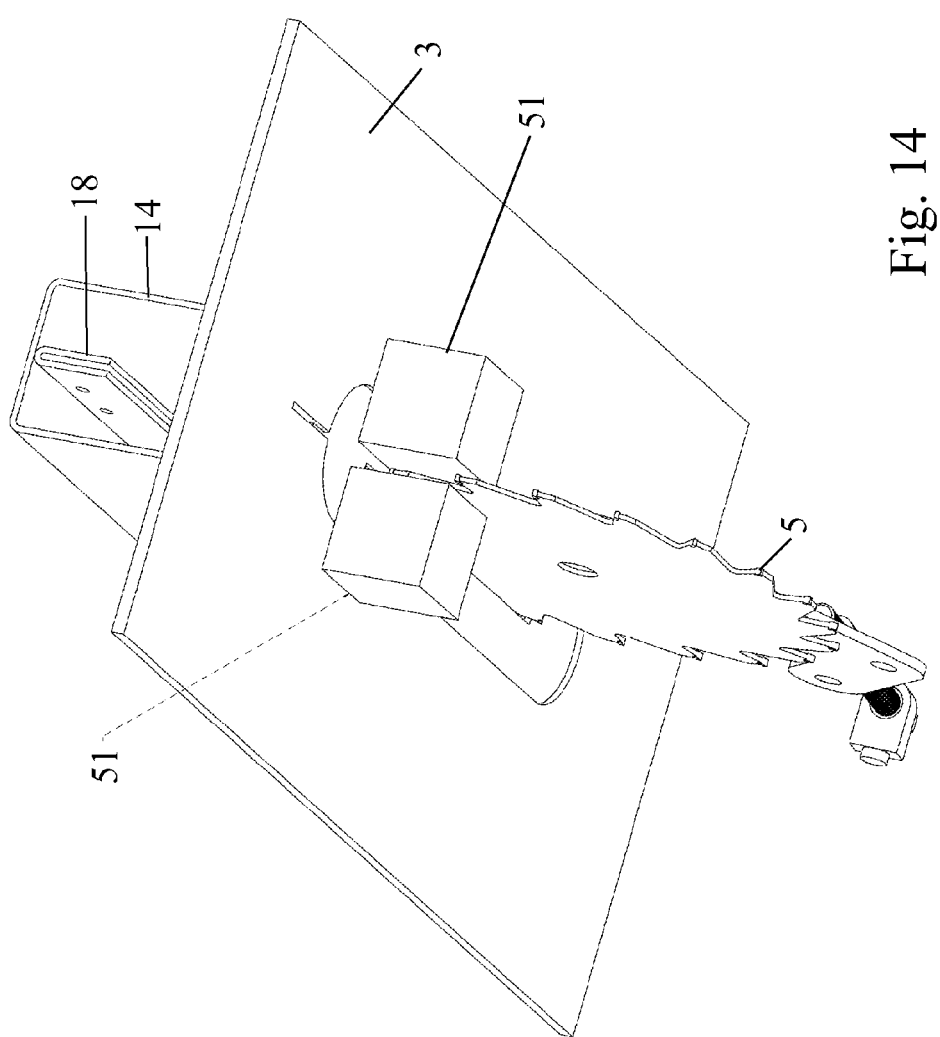
FIG. 14 is a bottom perspective view of a dual sliding electromagnet saw brake.

FIG. 14 is a bottom perspective view of a dual sliding electromagnet saw brake.

Figure 15:
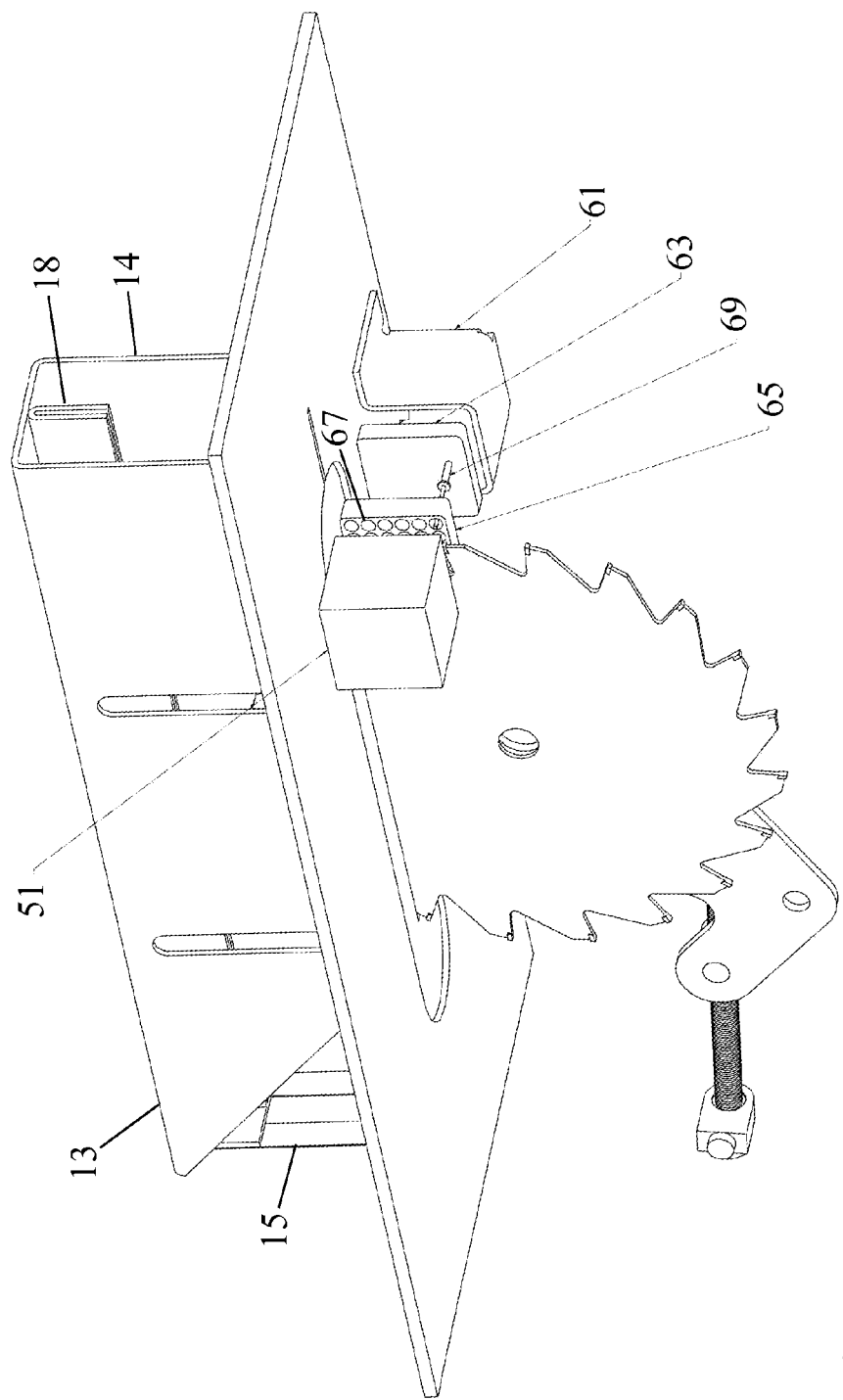
FIG. 15 is a bottom perspective view of a dual sliding electromagnet saw brake with a plate and steel rods.

On the bottom of table 3, spaced about ¼ inch from the saw blade 5, two sliding electromagnets 51 are positioned in two U-shaped housings similar to the housings 61 shown in FIG. 15.

Relatively weak permanent magnets similar to the permanent magnet shown in FIG. 15 are fixed in the housings to draw the electromagnets away from the saw blade 5.

When a conducting element approaches or contacts the conductive sensors 15 shown in FIGS. 1, 2, 5, 7, and 10, the current to the saw motor is cut off and the electromagnets 51 are energized. The electromagnets quickly slide in the holders towards the saw blade, braking the saw blade instantly to a stop.

When the electromagnets are deenergized by moving the conductive element, hands, or fingers away from the conductive sensors 15, the electromagnets are pulled back into the U-shaped holders by the permanent magnets fixed in the holders. The permanent magnets may be replaced by retraction springs that pull the electromagnet about ¼ inch away from the saw blade and against stops.

Opposing saw-contacting surfaces 53 of the electromagnets 51 are ideally a ballistic resistant material.

FIG. 15 is a bottom perspective view of a dual sliding electromagnet saw brake with a plate and steel rods.

FIG. 15 is a partially exploded view showing one of the two housings 61 removed from permanent magnet 63, which is fixed in the outer end of the housing.

Steel block 65 with rod-receiving openings 67 is slidable in housing 61. Steel rods 69 are mounted for sliding in the openings 67. The permanent magnet 63 draws the block 65 and the rods 69 away from the saw blade.

The electromagnet 51 is mounted in a housing similar and opposite to housing 61. A weak permanent magnet is mounted in the outer end of the housing to draw the electromagnet 51 away from the saw blade when the electromagnet is deenergized.

When a conductive object such as a finger or hand closely approaches or contacts the conductive sensors 15, electromagnet 51 is energized and slides in its housing and into the saw blade 5 and pulls block 65 into contact with the saw blade 5. At the same instant, rods 69 are drawn through openings 67 in block 65. The rods contact the saw blade 5 and engage the saw teeth, positively blocking rotation of the saw blade 5.

The electromagnets 51 and the block and rods are held in position about ¼ inch away from the saw blade. The electromagnets 51 have dimensions of 2×2×2 inches in one embodiment. The block 65 is about 2×2×¾ and the openings 67 are about ¼ inch diameter. The sliding rods 69 have about ¼ or ⅜ inch diameters and slide in ⅜ or ½ inch openings in the block. The electromagnets 51 when energized have a force of about 50-60 pounds. The retraction springs or permanent magnets 63 have a force of about 2 or 3 pounds.

Figure 16:
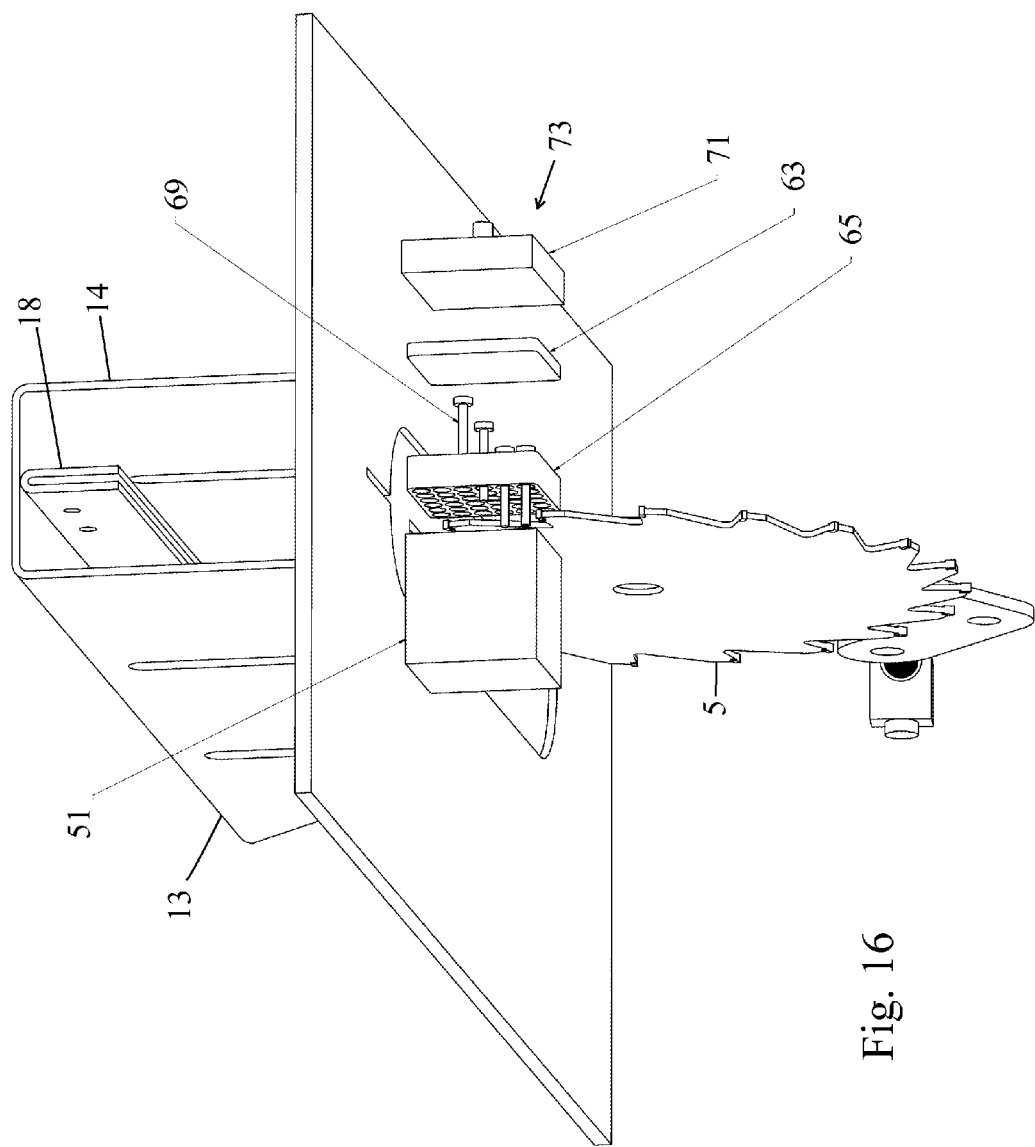
FIG. 16 is a bottom rear perspective partially exploded view of saw brake elements.

FIG. 16 is a bottom rear perspective partially exploded view of saw brake elements. Housings 61 similar to housing 61 shown in FIG. 16 are attached to a bottom of the saw table. Electromagnet 51 slides in one housing 61. A permanent magnet plate is fixed 63 in that housing to hold the electromagnet about ¼ inch away from the saw blade 5. A perforated plate 65 having perforations 67 in which rods 69 slide, a permanent magnet plate 63 and a push solenoid 71 slides in the opposite housing 66. The permanent magnet plate 63 holds the rods 69 about ½ inch away from the saw. The push solenoid 71 is energized at the same time as electromagnet 51 is energized. The solenoid 71 pushes the assembly 73 of the permanent magnet plate 63, the perforated plate 65 and the rods 69 toward the saw blade 5. When energized, the electromagnet 51 draws the perforated plate 65 and the rods 69 into contact with the saw blade and draws some of the rods into contact with the saw teeth, braking the saw blade.

When energization of the electromagnet 51 and push solenoid 71 cease, they are returned to their at rest position by springs, a reverse pulse on solenoid 71 and/or permanent magnets fixed in outermost regions of the opposite housings 61.

While the invention has been described with reference to specific embodiments, modifications and variations of the invention may be constructed without departing from the scope of the invention.

I claim:

1. An apparatus comprising:
   a power saw having a table, a saw blade extending through the table, a saw motor mounted beneath the table and a saw power circuit connected to the saw motor for driving the saw blade,
   a saw guard mounted on the table adjacent to the saw blade,
   a saw brake further comprising
   a conductive sensor mounted on the saw guard in front of the saw blade;
   a switch electrically connected to the conductive sensor, the switch being configured to change output states upon a conductive element approaching the conductive sensor; and
   a movable saw blade brake having an electromagnet on one side of the saw blade and having a block with holes holding movable saw blade brake rods on an opposite side of the saw blade, the block and the electromagnet being mounted beneath the table and adjacent to the saw blade, a saw brake activator electrically connected to the switch and configured to move activate the electromagnet to pull the saw blade brake against rods into and through the saw blade, causing the saw blade brake to immediately stop the saw blade upon a conductive element approaching the conductive sensor and, the activation of the electromagnet pulling or pushing the saw blade brake elements rods into interference contact with the saw blade by the activated electromagnet by pulling the electromagnet and the saw blade brake into contact with the saw blade and pulling the saw blade brake rods from an the opposite side of the saw blade through openings in teeth of the saw blade and into the electromagnet, thereby stopping the saw blade and the motor when the switch is activated;
   wherein the block has the holes extending therethrough in a direction perpendicular to the saw blade and the saw blade brake rods are magnetically permeable rods mounted for sliding in the holes whereupon energizing the electromagnet pulls the electromagnet into contact with the saw blade and pulls the block and the rods into contact with the saw blade with at least some of the saw blade brake rods engaging teeth of the saw blade and braking the saw blade against movement;
   wherein the switch is electrically connected to the saw power circuit for interrupting the saw power circuit and preventing power from reaching the saw motor upon a conductive element approaching the conductive sensor.

2. The apparatus of claim 1, wherein the saw brake activator comprises an electromagnet energizing circuit, and the saw brake and the electromagnet are configured to use electromagnetic force to drive the saw brake and the block against the saw blade movably held by the block and the rods through the teeth to stop the saw blade.

3. The apparatus of claim 2, wherein the electromagnet and the block positioned on opposite sides of the saw blade and are connected to arms pivotally mounted on opposite sides of the saw blade, and wherein the apparatus further comprises springs attached to the arms.

4. The apparatus of claim 3, wherein the springs are configured to hold the arms, the electromagnet, and the block away from the saw blade in the absence of activation of the electromagnetic energizing circuit and the force generated by the electromagnet.

5. The apparatus of claim 1, further comprising U-shaped housings connected to a bottom of the saw table on opposite sides of the saw blade and holding the electromagnet and the block for sliding in the housings.

6. The apparatus of claim 5, further comprising two or more permanent magnets mounted in outer portions of the housing on opposite sides of the saw blade for holding the electromagnet and the block and the rods spaced away from the saw blade until the electromagnet is energized.

7. The apparatus of claim 1, further comprising a push solenoid for pushing the block with holes and the rods toward the saw blade when the electromagnet and the push solenoid are energized.

* * * * *